(12) United States Patent
Holzapfel

(10) Patent No.: US 9,068,811 B2
(45) Date of Patent: Jun. 30, 2015

(54) DEVICE FOR DETERMINING DISTANCE INTERFEROMETRICALLY

(75) Inventor: Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 275 days.

(21) Appl. No.: 13/596,836

(22) Filed: Aug. 28, 2012

(65) Prior Publication Data

US 2013/0057872 A1    Mar. 7, 2013

(30) Foreign Application Priority Data

Aug. 30, 2011   (DE) .......................... 10 2011 111 900

(51) Int. Cl.
*G01B 11/02*    (2006.01)
*G01B 9/02*    (2006.01)
*G01B 11/14*    (2006.01)

(52) U.S. Cl.
CPC ............ *G01B 9/02056* (2013.01); *G01B 11/14* (2013.01); *G01B 9/02061* (2013.01); *G01B 9/02018* (2013.01); *G01B 9/02022* (2013.01)

(58) Field of Classification Search
CPC .............. G01B 9/02; G01B 11/02; G02B 6/42
USPC ....................... 356/492, 499, 616; 250/227.25
See application file for complete search history.

(56) References Cited

U.S. PATENT DOCUMENTS

| | | | |
|---|---|---|---|
| 4,606,638 A * | 8/1986 | Sommargren | 356/492 |
| 6,307,198 B1 * | 10/2001 | Asakura et al. | 250/227.25 |
| 7,573,581 B2 | 8/2009 | Holzapfel | |
| 7,872,762 B2 | 1/2011 | Hermann et al. | |
| 2008/0285058 A1 * | 11/2008 | Holzapfel | 356/616 |
| 2012/0105862 A1 | 5/2012 | Holzapfel | |

FOREIGN PATENT DOCUMENTS

| | | |
|---|---|---|
| DE | 10 2007 016 774 | 10/2008 |
| EP | 1 762 828 | 3/2007 |
| EP | 2 085 752 | 8/2009 |

OTHER PUBLICATIONS

European Search Report, dated Nov. 2, 2012, issued in corresponding European Patent Application No. 12177860.9.
U.S. Appl. No. 61/409,646, filed on Nov. 3, 2010.
German Patent Application No. 10 2010 043 263, Nov. 3, 2010.

* cited by examiner

*Primary Examiner* — Tarifur Chowdhury
*Assistant Examiner* — Jamil Ahmed
(74) *Attorney, Agent, or Firm* — Kenyon & Kenyon LLP

(57) ABSTRACT

A device for interferometrically determining the distance between two plates disposed substantially in parallel, includes a light source, beam-splitter element(s), reflector element(s), deflection elements, retroreflectors, and a detection unit. A beam of rays emitted by the light source falls on the first plate and splits into a reflected reference beam of rays and a transmitted measuring beam of rays. The measuring beam strikes a reflector on the second plate and undergoes a first reflection back toward the first plate. The reference beam traverses a first deflection element, and the measuring beam traverses a second deflection element. Both beams pass through a retroreflector. The reference beam is reflected at the first plate, and the measuring beam undergoes a second reflection at a reflector of the second plate, so that both beams propagate collinearly interferingly toward the detection unit, where a plurality of phase-shifted distance signals are generated.

15 Claims, 6 Drawing Sheets

DEVICE FOR DETERMINING DISTANCE INTERFEROMETRICALLY

CROSS-REFERENCE TO RELATED APPLICATIONS

The present application claims priority to Application No. 10 2011 111 900.4, filed in the Federal Republic of Germany on Aug. 30, 2011, which is expressly incorporated herein in its entirety by reference thereto.

FIELD OF THE INVENTION

The present invention relates to a device for interferometrically determining the distance between two plates disposed substantially in parallel.

BACKGROUND INFORMATION

Besides determining changes in position of two objects movable relative to each other in a lateral direction, there are measuring tasks where it is necessary, exclusively or possibly additionally, to also determine the distance between these objects in a vertical direction perpendicular thereto. For example, it may be a matter of determining the distance between two plates disposed substantially parallel to each other, these plates being only a small distance from each other. In doing this, interferometric methods as described, for example, in German Published Patent Application No. 10 2007 016 774 and U.S. Pat. No. 4,606,638 present themselves for an extremely precise distance measurement.

The device for determining distance interferometrically described in German Published Patent Application No. 10 2007 016 774 includes an emitter-receiver unit, located on a glass plate, which is placed at a distance to be ascertained from an object, a mirror being disposed on the object. Situated on the glass plate are splitting gratings that split the beam of rays, emitted by the light source, into at least one measuring beam of rays and at least one reference beam of rays. The measuring beam of rays propagates in the direction of the mirror on the object and is thereby reflected back in the direction of the emitter-receiver unit. The reference beam of rays propagates exclusively in the glass plate, and after several reflections in the emitter-receiver unit is superposed interferingly with the measuring beam of rays. From the interference signals thus obtained, the distance between the glass plate and the object or the changes in distance between these components may be ascertained in a conventional manner. However, the device described in German Published Patent Application No. 10 2007 016 774 has the disadvantage that in the event of tilting between the glass plate and the mirror, incorrect distance signals result.

The device described in U.S. Pat. No. 4,606,638 is based on what is termed a Fizeau interferometer, by which the distance between two parallel plates is determinable extremely precisely using an interferometric method. In this case as well, however, for a precise determination of distance, it is essential that the two plates be aligned very exactly in parallel relative to each other. Otherwise, a sharp signal drop results. Thus, the mounting and operational tolerances are extremely small for this device for determining distance interferometrically, as well. Moreover, when using a Fizeau interferometer, measuring accuracy is very limited due to the unavoidable multiple-beam interference.

SUMMARY

Example embodiments of the present invention provide a device for the extremely precise interferometric determination of distance between two plates disposed substantially in parallel, that exhibits improved mounting and operational tolerances, e.g., is particularly insensitive with respect to possible tilting of the two plates.

According to example embodiments of the present invention, a device for interferometrically determining the distance between two plates disposed substantially in parallel includes a light source, at least one beam-splitter element, at least one reflector element, a plurality of deflection elements, a plurality of retroreflectors, and a detection unit. In that context, a beam of rays emitted by the light source falls in inclined fashion upon a beam-splitter element on the first plate and is split there into a reflected reference beam of rays and a transmitted measuring beam of rays. The measuring beam of rays strikes a reflector element on the second plate and undergoes a first reflection there back in the direction of the first plate. The reference beam of rays passes through a first deflection element, and the measuring beam of rays passes through a second deflection element. The reference and measuring beams of rays each subsequently pass through an assigned retroreflector. The measuring beam of rays then traverses a third deflection element, and the reference beam of rays traverses a fourth deflection element, both the first and second deflection elements and the third and fourth deflection elements in each case producing different deflection effects on the traversing reference and measuring beams of rays. The reference beam of rays is then reflected at the first plate, and the measuring beam of rays then undergoes a second reflection back at a reflector element of the second plate, so that the measuring beam of rays and the reference beam of rays then propagate collinearly in the direction of the detection unit, where a plurality of phase-shifted distance signals are able to be generated from the interfering measuring and reference beams of rays.

The retroreflectors may include a first diffractive lens, a reflector element, and a second diffractive lens, the first diffractive lens focusing the measuring or reference beam of rays falling upon it onto the reflector element, and the second diffractive lens collimating the emergent measuring or reference beam of rays reflected by the reflector element.

In this context, it is possible for the first and second diffractive lens to be disposed on a first side of a plate-shaped, transparent carrier element, and on the opposite second side of the carrier element, for the reflector element to be disposed, with its reflective side oriented in the direction of the first side.

Moreover, It may be provided that: the first deflection element and the first diffractive lens and the fourth deflection element and the second diffractive lens of a first retroreflector are formed as first and fourth combined, diffractive deflection/lens element; and the second deflection element and the first diffractive lens and the third deflection element and the second diffractive lens of a second retroreflector are formed as second and third combined, diffractive deflection/lens element.

It is possible to arrange the combined, diffractive deflection/lens elements on a first side of a plate-shaped, transparent carrier element, and on the opposite second side of the carrier element, to dispose the reflector element, with its reflective side oriented in the direction of the first side.

The optical path lengths of the measuring and reference beams of rays may be identical in one defined nominal position.

To achieve this, it may be provided to form the respective retroreflectors assigned to the measuring and reference beams of rays differently, in order to set identical optical path lengths.

Advantageously, the following holds true for the angle at which the beam of rays, emitted by the light source, falls in inclined fashion upon the first plate:

$$\tan(\Theta) > rS/zP,$$

in which $\Theta$ represents the angle with respect to a vertical to the first plate, at which angle the beam of rays emitted by the light source falls upon the first plate, rS represents the beam radius of the light source, and zP represents the distance between the first and second plate.

The first plate may take the form of a transparent plane-parallel plate, on whose side facing away from the light source, in a spatially restricted first area, a planar beam-splitter layer is disposed as beam-splitter element, upon which the beam of rays, emitted by the light source, falls; and on the same side in a spatially restricted second area, a further planar beam-splitter layer is disposed as a further beam-splitter element, upon which the measuring beam of rays falls after the second reflection back at the reflector element of the second plate, and upon which the reference beam of rays falls after traversing the fourth deflection element.

It is further possible that the first plate has an antireflection layer on the side facing the light source as well as on the opposite side outside of the areas having the beam-splitter elements, and/or has a diaphragm in the area in which the collinearly superposed measuring and reference beams of rays propagate in the direction of the detection unit.

Moreover, the second plate may be in the form of a transparent plane-parallel plate, on whose side facing the light source, planar mirror layers are disposed as reflector elements, whose reflective sides are oriented in the direction of the first plate.

It is further possible to provide a system that includes the device described herein with an optical position-measuring device that is suitable for detecting a relative shift of the first and second plate parallel to the placement planes of the two plates.

The measuring points of the optical position-measuring device and of the device for determining distance interferometrically may coincide.

An advantage of the device described herein is a great insensitivity with respect to possible tilting of the two plates, resulting, in turn, in improvide mounting and operational tolerances. Substantially responsible for this is the inclusion of retroreflection, via which at least one of the beams of rays brought to interference is reflected a second time by one of the two plates. Because of the second reflection, for example, of the measuring beam of rays at one plate resulting in this case, a possible tilting of this plate relative to the required parallel alignment is offset optically and thus no longer causes measuring errors.

The device also allows the use of measuring and reference beams of rays having expanded beam cross-sections. In this manner, the determination of distance interferometrically becomes insensitive with respect to possible local defects on the two plates, since a beam of rays having a large beam cross-section covers the average surface properties over a correspondingly larger area.

In the device described herein, the measuring and reference beams of rays always fall in inclined fashion upon the two plates, whose distance from each other is to be determined. This ensures that the beams of rays which are reflected back and forth several times between the two plates and which do not contribute to the signal acquisition are so greatly deflected laterally that they are no longer able to strike the detection unit. In this manner, the signal quality and measuring accuracy are increased.

On the part of the two plates, only homogeneous, planar coatings are provided on the two plates as optically functionally-relevant components, that is, in particular, no grating structures. That is why, in the case of a lateral shift of the two plates relative to each other, the resulting distance signals remain constant to the greatest extent possible. An electronic signal correction to minimize possible interpolation errors in the case of a lateral shift of the plates relative to each other is therefore not necessary for the distance signals.

Moreover, the device may be combined with an optical position-measuring device for detecting the relative shift of the two plates in the lateral direction, in order to form one overall system.

Further features and aspects of example embodiments of the present invention are described in more detail below with reference to the appended Figures.

BRIEF DESCRIPTION OF THE DRAWINGS

FIG. 1b is a schematic view of a section of the beam path illustrated in FIG. 1a.

DETAILED DESCRIPTION

Figure 1A:
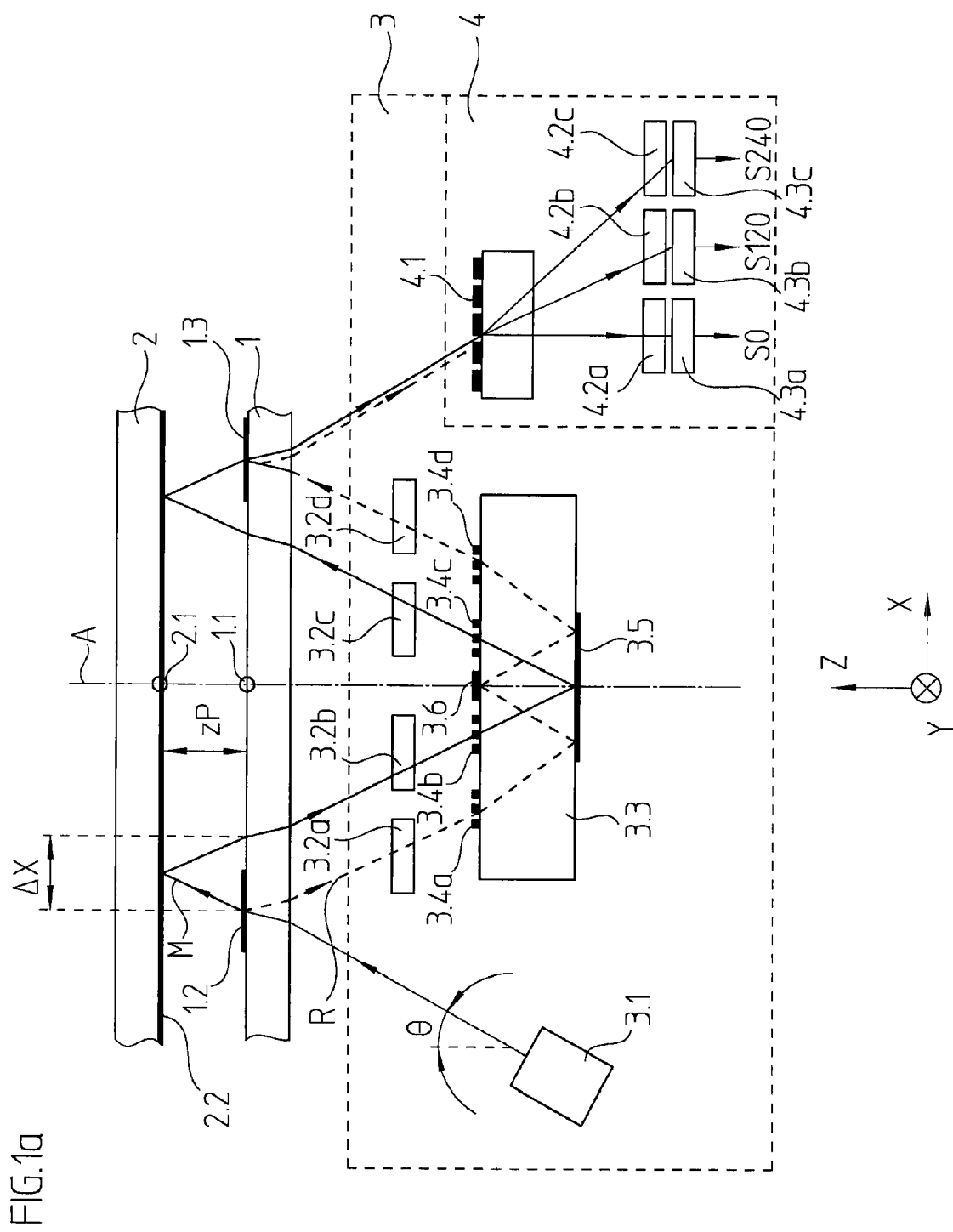
FIG. 1a is a schematic view of a beam path of a device according to an example embodiment of the present invention.
Figure 1B:
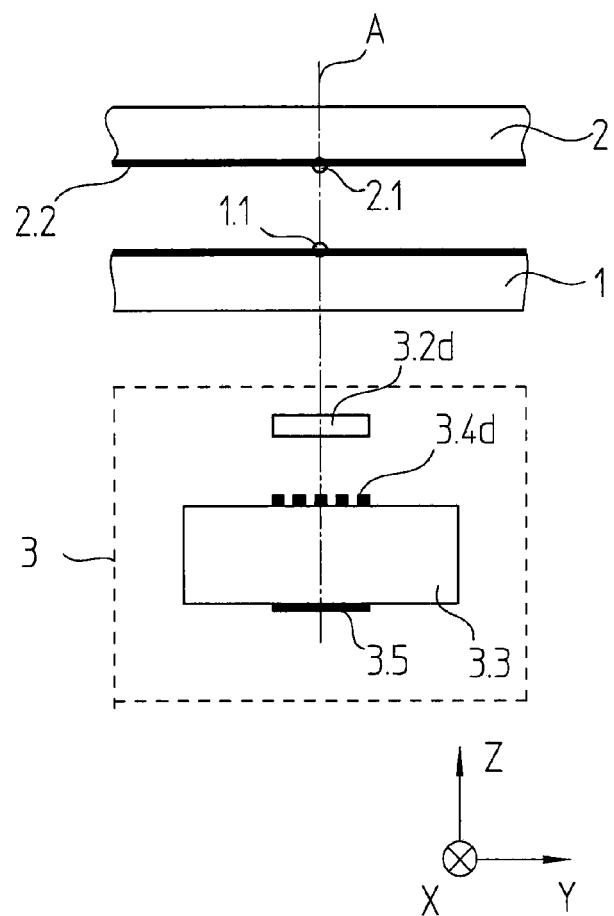
Figure 2:
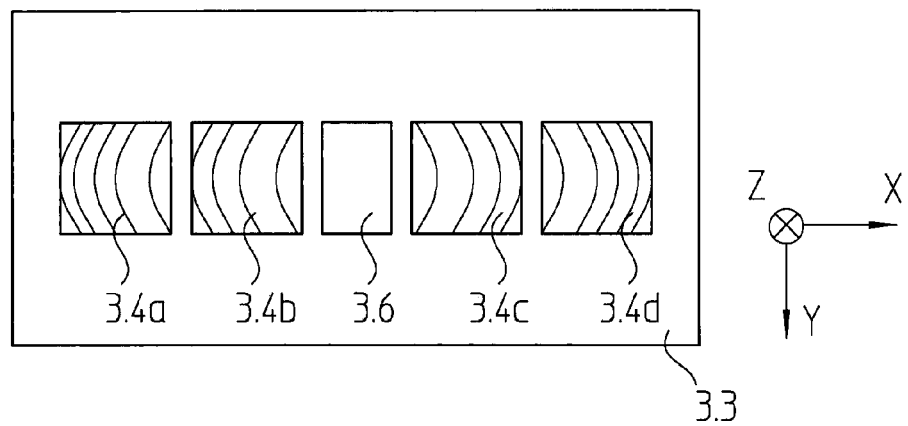
FIG. 2 is a plan view of the top side of the scanning plate of the device illustrated in FIGS. 1a and 1b.

A device according an exemplary embodiment of the present invention will now be explained with reference to FIGS. 1a, 1b, and 2. FIGS. 1a and 1b schematically show different views of the beam path of this exemplary embodiment or sections thereof. FIG. 2 shows a plan view of the top side of the scanning plate of this device.

With the aid of the device described herein, it is possible to interferometrically determine distance zP between two plates 1, 2, positioned substantially in parallel, with high accuracy. For instance, the two plates 1, 2 are two plane-parallel plates made of glass that are provided in an optical position-measuring device, for example, and are movable in the lateral xy-plane in one or two directions relative to each other. The system, which includes the optical position-measuring device and the device for determining distance interferometrically, is disposed in a machine and is used to generate extremely accurate position information for a machine control with respect to machine components that are movable relative to each other and are joined to the two plates 1, 2. Position sensing in the xy-plane is possible via the optical position-measuring device. To that end, on both plates 1, 2 in the area of locations 1.1, 2.1, measuring standards in the form of grating structures are provided in order, by optically scanning them, to produce position information with respect to the shift of plates 1, 2 relative to each other in the lateral xy-plane. In addition to the measuring standard, the corresponding optical position measuring device also includes a scanning head that is situated, e.g., in scanning unit 3 of the distance determining device. Suitable scanning optics and suitable optical position-measuring devices, respectively, are described, for example, in German Patent Application No. 10 2010 043 263 and U.S. Provisional Patent Application No. 61/409,646, each of which is expressly incorporated herein in its entirety by reference thereto. From the position information with respect to the shift of plates 1, 2 in the xy-plane and from vertical distance zP between the two plates 1, 2 along the z-direction determined with the aid of the distance determining device, the spatial position of both plates 1, 2 is able to be determined with extreme accuracy in six degrees of freedom. In turn, this information may be used, for example, in the machine in which the system that includes the optical position-measuring device and the distance determining device is provided, to determine with extreme precision the spatial position of the machine parts movable relative to each other, and in so doing, for example, to also correct what are termed Abbe errors in the position determination. Further advantageous details of the system that includes the distance determining device and the optical position-measuring device will be discussed in more detail below.

In the first depicted exemplary embodiment of the distance determining device, the various components of the device are located in a scanning unit 3 that is placed so as to be set apart from the two plates 1, 2 in the z-direction.

Providing all components in a single shared scanning unit is not absolutely necessary. For example, it is possible to dispose light source 3.1, for example, and/or detection unit 4 or parts thereof spatially separate from scanning unit 3, and to connect them to scanning unit 3 with the aid of light-conducting fibers.

To clarify the functional principle of the distance determining device, the scanning beam path in the first exemplary embodiment, via which a plurality of phase-shifted distance signals S0, S120, S240 with regard to distance zP or with regard to changes in distance zP between the two plates 1, 2 are generated, will be explained in the following.

The beam of rays emitted by a light source 3.1 in scanning unit 3 falls, inclined by an angle Θ relative to optical axis A, upon a beam-splitter element 1.2 on first plate 1. Preferably, a laser that emits a linearly polarized beam of rays is used as light source 3.1. In the present example, beam-splitter element 1.2 is in the form of a planar beam-splitter layer which is disposed on that side of first plate 1 which is oriented facing away from light source 3.1. This side is also denoted hereinafter as the top side of first plate 1. The beam of rays incoming from light source 3.1 is split via beam-splitter element 1.2 into two partial beams of rays, of which one is reflected and the other is transmitted. The reflected partial beam of rays is denoted hereinafter as reference beam of rays R, the transmitted beam of rays, as measuring beam of rays M. The designation of the two split beams of rays as measuring and reference beams of rays M, R is arbitrary, and reverse designations could also be selected.

Measuring beam of rays M subsequently strikes second plate 2, which is nominally parallel to first plate 1. A reflector element 2.2 is disposed on the side of second plate 2 facing first plate 1, this side also denoted hereinafter as bottom side of second plate 2. Reflector element 2.2 is formed as a planar mirror layer whose reflective side is oriented in the direction of first plate 1. At reflector element 2.2, measuring beam of rays M undergoes a first reflection back in the direction of first plate 1. Measuring beam of rays M then passes through first plate 1 in a transparent, optically ineffective area, traverses a polarization-optical element 3.2b in the form of an λ/8-plate, and then arrives at a scanning plate 3.3 in scanning unit 3. In scanning plate 3.3, optical elements located on it implement various optical functions that produce certain optical effects on measuring beam of rays M during its traversal of scanning plate 3.3. Thus, in this case, measuring beam of rays M traverses a first deflection element, an assigned retroreflector as well as a fourth deflection element, before it propagates again in the direction of the two plates 1, 2.

Figure 3:
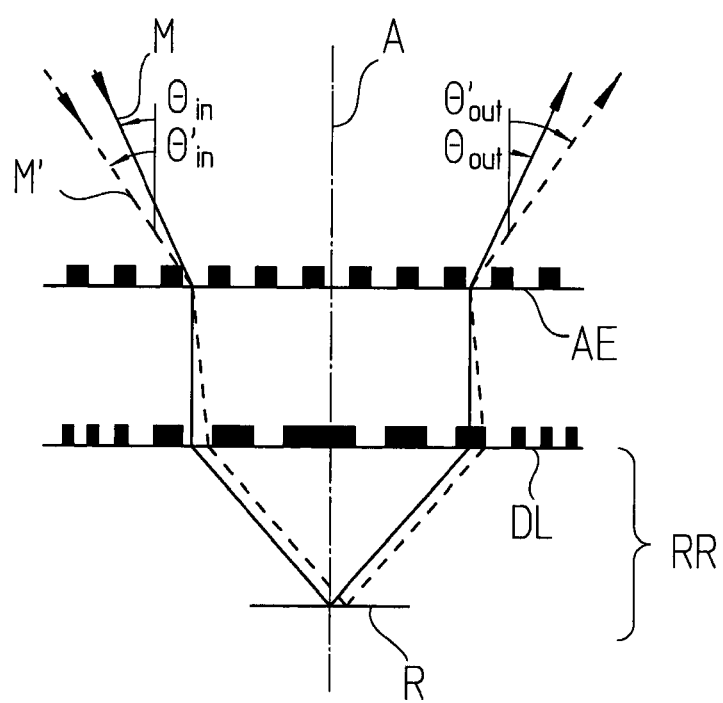
FIG. 3 is a schematic view of one component of a device according to an example embodiment of the present invention.

For a more detailed explanation of the various optical effects on measuring beam of rays M when traversing scanning plate 3.3, reference is made to FIG. 3. Measuring beam of rays M incoming from the direction of the two plates 1, 2 first of all passes through a deflection element AE in the form of a grating. In so doing, measuring beam of rays M, incident at angle of incidence $\Theta_{in}$ with respect to optical axis A, is deflected by deflection element AE such that after it has traversed deflection element AE, it further propagates parallel to optical axis A in the direction of a retroreflector RR. In the example shown, retroreflector RR includes a diffractive lens DL and a reflector element R in the form of a mirror layer. Preferably, diffractive lens DL and reflector element R are disposed on the opposite sides of a plate-shaped, transparent carrier element. Measuring beam of rays M is focused by diffractive lens DL onto reflector element R. From reflector element R, a reflection results back in the direction of diffractive lens DL, which collimates the emergent measuring beam of rays M again before it once more strikes deflection element AE. Upon traversing deflection element AE, measuring beam of rays M is finally deflected by it in a manner opposite to the first deflection, namely, at emergence angle $\Theta_{out}$ away from optical axis A, where $\Theta_{in}=\Theta_{out}$.

Deflection element AE and/or also diffractive lens DL of retroreflector RR may have a multipiece construction, e.g., only in the area of incident and emergent measuring beam of rays M.

In response to a small change in angle of incidence $\Theta'_{in}$ of measuring beam of rays M'—for example, because of a tilting of both plates 1, 2—toward a somewhat flatter angle of incidence $\Theta'_{in}$, after deflection element AE, emergence angle $\Theta'_{out}$ of measuring beam of rays M' becomes somewhat steeper. The configuration shown in FIG. 3, including deflection element AE and retroreflector RR, differs therefore from a simple reflection by mirror which would translate a flatter angle of incidence into a flatter emergence angle, as well. If one considers a small change of angle $\delta\Theta_{in}=\Theta'_{in}-\Theta_{in}$ of measuring beam of rays M' falling upon it, it is then translated into an opposite change of angle $\delta\Theta_{out}=\Theta'_{out}-\Theta_{out}=-\delta\Theta_{in}$, which corresponds to the typical optical property of a retroreflector. That is to say, the combination of deflection element AE and retroreflector RR deflects incident measuring beam of rays M' into a different, arbitrarily selectable direction. Angle changes of incident measuring beam of rays M' deviating slightly from that are always translated into opposite angle changes of emergent measuring beam of rays M'.

Furthermore, deflection element AE deflects measuring beam of rays M, M' differently during the first and second passage. Thus, as illustrated in FIG. 3, incident measuring beam of rays M, M' is deflected in the $+1^{st}$ order of diffraction, but emergent measuring beam of rays M is deflected in the $-1^{st}$ order of diffraction.

As an alternative to the arrangement illustrated in FIG. 3 having separate deflection element AE and diffractive lens DL, it may be provided to combine these two elements AE, DL and their optical functionality in a single diffractive element. Such an element is denoted hereinafter as a combined, diffractive deflection/lens element and is provided concretely in the first exemplary embodiment of the device illustrated in FIGS. 1a and 1b. The combined, diffractive deflection/lens element may be arranged on one side of a plate-shaped, transparent carrier element, and on the opposite side, the reflector element with its reflective side oriented in the direction of the other side.

Consequently, in the first exemplary embodiment of the device, a second combined, diffractive deflection/lens element 3.4b is arranged on the side of scanning plate 3.3 which faces the two plates 1, 2. By way of the corresponding optical deflection function, this deflection/lens element deflects measuring beam of rays M parallel to optical axis A, and at the same time, focuses it via its optical lens function onto a reflector element 3.5 on the opposite side of scanning plate 3.3. There, measuring beam of rays M strikes reflector element 3.5 in the area of optical axis A, is reflected by it and arrives at a third, combined, diffractive deflection/lens element 3.4c. Via third combined, diffractive deflection/lens element 3.4c and its optical lens function, measuring beam of rays M is collimated, and via the optical deflection function of third, combined, diffractive deflection/lens element 3.4c, measuring beam of rays M is deflected toward optical axis A at angle Θ. Thereupon, measuring beam of rays M propagating in the direction of the two plates 1, 2 initially passes through a further polarization-optical element 3.2c, again in the form of an λ/8-plate, then traverses a transparent area of plate 1, and finally falls again upon reflector element 2.2 on second plate 2. There, it then undergoes a second reflection back, thereupon passes through a further beam-splitter element 1.3 on first plate 1 and propagates in the direction of a detection unit 4.

Reference beam of rays R, produced at beam-splitter element 1.2 of first plate 1, is reflected back in the direction of scanning unit 3, and there, traverses a polarization-optical element 3.2a in the form of an λ/8-plate and arrives at a first, combined, diffractive deflection/lens element 3.4a, which is disposed on the same side of scanning plate 3.3 as second, combined, diffractive deflection/lens element 3.4b traversed by measuring beam of rays M. First, combined, diffractive deflection/lens element 3.4a exerts a basically comparable optical function on reference beam of rays R as second combined, diffractive deflection/lens element 3.4b exerts on measuring beam of rays M. This means that via the optical deflection function of first combined, diffractive deflection/lens element 3.4a, reference partial beam of rays R is aligned parallel to optical axis A, while via its optical lens function, it is focused by reflector element 3.5 in the area of optical axis A onto reflector element 3.6, which is situated on the side of scanning plate 3.3 facing the two plates 1, 2. From reflector element 3.6, reference beam of rays R then arrives, by a further reflection at reflector element 3.5, at fourth combined, diffractive deflection/lens element 3.4d. It collimates reference beam of rays R again and deflects it, likewise at an angle Θ, toward optical axis A. Thus, reference beam of rays R traverses a first deflection element, an assigned retroreflector as well as a fourth deflection element, before it propagates again in the direction of the two plates 1, 2. After traversing a polarization-optical element 3.2d in the form of an λ/8 plate, reference beam of rays R then arrives at beam-splitter element 1.3 on first plate 1, where it is superposed with measuring beam of rays M likewise incoming there, and after a further reflection, propagates in the direction of detection unit 4.

Because of the symmetrical disposition of first and fourth combined, diffractive, deflection/lens elements 3.4a, 3.4d as well as of second and third combined, diffractive deflection/lens elements 3.4b, 3.4c relative to optical axis A and the focus locations on optical axis A in each instance, it is ensured that measuring and reference beams of rays M, R strike at the same location on beam-splitter element 1.3 of first plate 1, and then propagate collinearly toward detection unit 4.

In the present exemplary embodiment, the longer optical path which reference beam of rays R traverses in scanning plate 3.3 due to the additional reflection at reflector element 3.6 is preferably selected so that in the nominal position of plates 1, 2, it is equal to the additional optical path of measuring beam of rays M between plates 1, 2. The optical path lengths of the two beams of rays are therefore compensatable in the nominal position. The result of this is an especially low position jitter, since the phase jitter of light source 3.1 no longer has any influence in this nominal position. In addition, a light source 3.1 having a short coherence length is usable, which substantially reduces disturbances due to unintentional interference reflections (e.g., as a result of speckle formation on housing walls).

In order to generate phase-shifted distance signals S0, S120, S240, measuring and reference beams of rays M, R are circularly polarized oppositely to each other by correspondingly oriented polarization-optical components 3.2a to 3.2d, each in the form of an λ/8-plate. A splitting grating 4.1 in detection unit 4 splits the two collinear measuring and reference beams of rays M, R in each case into three further partial beams of rays. They traverse polarizers 4.2a, 4.2b, 4.2c, respectively, before they are converted by optoelectronic detector elements 4.3a, 4.3b, 4.3c into phase-shifted, electrical distance signals S0, S120, S240. Polarizers 4.2a, 4.2b, 4.2c are oriented at an angle of 60° relative to each other, so that in each case a phase shift of 120° results between generated distance signals S0, S120, S240.

In the first exemplary embodiment illustrated, all beams of rays take a course from light source 3.1 to detection unit 4 in one plane, e.g., in the XZ plane shown in FIG. 1a. For reasons of symmetry, the effective measuring point for each of the two plates 1, 2 lies on optical axis A between the impact points of corresponding partial beams of rays M, R. As illustrated in FIGS. 1a and 1b, the effective measuring point for the second plate lies at location 2.1 on the bottom side of plate 2. For first plate 1, the effective measuring point lies at location 1.1 on the top side of plate 1. Measuring points 1.1, 2.1 remain lying on optical axis A even in the event of a z-shift of first plate 1.

As mentioned above, with the aid of an additional optical position-measuring device, it is also possible to measure a lateral shift of the two plates 1, 2 in the xy-plane relative to each other. To that end, at measuring points 1.1, 2.1, both plates 1, 2 may have grating structures that are scanned by a suitable scanning head. The scanning head of scanning optics, as described, for example, in German Patent Application No. 10 2010 043 263 and U.S. Provisional Patent Application No. 61/409,646, is disposed in scanning unit 3, preferably in the vicinity of optical axis A and likewise has effective measuring points at locations 1.1, 2.1. Shared measuring points 1.1, 2.1 of the distance determining device and of an additional optical position-measuring device allow an especially advantageous evaluation of the generated distance signals, with easy determination of several degrees of freedom. Three such systems, each including the distance determining device and an additional optical position-measuring device, then furnish what is termed the 6D pose of the two plates 1, 2 relative to each other. The 6D pose may be used to calculate the relative position of plates 1, 2, or in each case machine parts joined to them, at the location of a tool center point (TCP). Any existing Abbe errors thereby become correctable.

The permissible shifts of plates 1, 2 in the xy-plane are limited by the lateral extension of reflector element 2.2 on second plate 2 and the lateral extensions of beam-splitter elements 1.2, 1.3 on first plate 1, respectively. In the first exemplary embodiment shown in FIGS. 1*a*, 1*b*, for example, the mirror layer of reflector element 2.2 on second plate 2 extends over the entire bottom side of plate 2, so that its shift range is limited only by the dimensions of plate 2. On the other hand, the beam-splitter layer of beam-splitter elements 1.2, 1.3 on the top side of first plate 1 is in each case extended only in strips along the y-direction, so that the plate is shiftable only slightly in the x-direction, but in wide ranges in the y-direction. The beam-splitter layers of beam-splitter elements 1.2, 1.3 may in each case also be applied extensively on the top side of first plate 1, to thereby permit maximally large shifting ranges. It may be that multiple reflections are then able to occur at both plates 1, 2, however, due to the selected beam tilt (angle Θ) at which the beam of rays coming from light source 3.1 falls upon the first plate and the large lateral beam displacement accompanying that, corresponding beams of rays from the measuring and/or reference beam of rays M, R do not arrive at detection unit 4. To that end, beam displacement Δx, illustrated in FIG. 1*a*, between the impact points of measuring and reference beams of rays M, R on the top side of first plate 1 must be greater than the lateral beam extension. Following from this is a condition for the minimally required angle of incidence Θ at which the beam of rays, emitted by light source 3.1, falls in inclined fashion upon first plate 1:

$$\tan(\Theta) > \frac{rS}{zP}, \quad \text{(equation 1)}$$

in which Θ represents the angle with respect to a vertical to the first plate, at which said angle the beam of rays emitted by the light source falls upon the first plate, rS represents the beam radius of the light source, and zP represents the distance between the first and second plate.

The observance of the condition according to equation 1 is also necessary when the beam-splitter layers of beam-splitter elements 1.2, 1.3 are limited laterally, since weak multiple reflections at the surfaces of plates 1, 2 are unavoidable in this case, as well, and must never be allowed to arrive in detection unit 4.

Moreover, it proves to be advantageous if, besides the observance of the condition from equation 1, first plate 1 is provided with an antireflection layer on the top side outside of the areas having beam-splitter elements 1.2, 1.3 and on the entire bottom side. It is also advantageous to place a diaphragm in front of detection unit 4 or in the area in which collinearly superposed measuring and reference beams of rays M, R propagate in the direction of detection unit 4, to thereby suppress interference reflections. In addition, it is beneficial to construct first plate 1 to be slightly wedge-shaped, in order to avoid interferences with multiple reflections within this plate 1.

Figure 5:
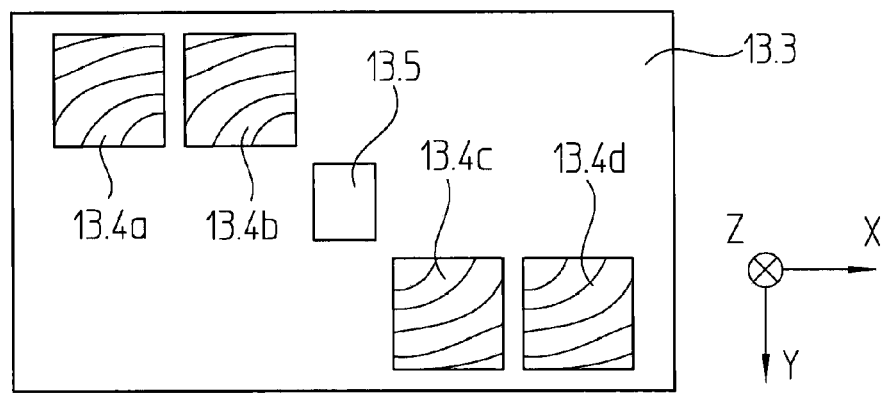
FIG. 5 is a plan view of the top side of the scanning plate of the device illustrated in FIGS. 4a and 4b.
Figure 6A:
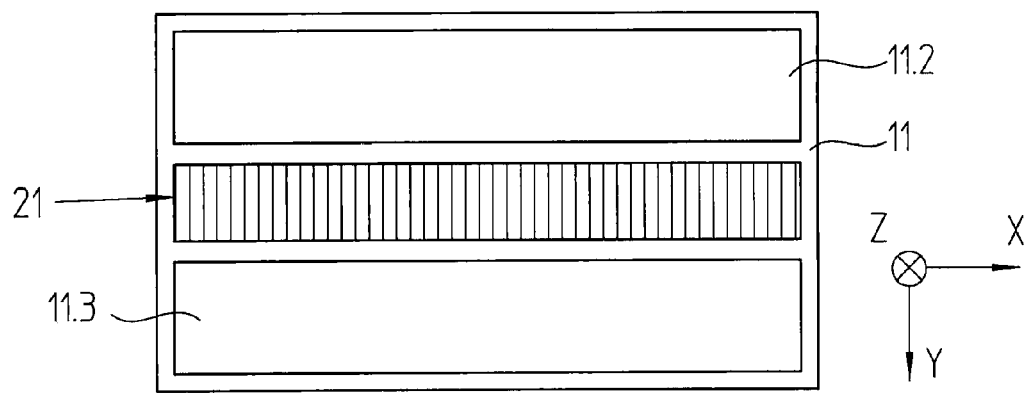
FIG. 6a is a plan view of the top side of the first plate of the device illustrated in FIGS. 4a and 4b.

A second exemplary embodiment of a distance determining device according is described in the following with reference to FIGS. 4*a*, 4*b*, 5, 6*a*, and 6*b*, only the substantial differences from the first example embodiment being discussed. Analogous to the first exemplary embodiment, FIGS. 4*a*, 4*b* schematically illustrate the beam path or sections thereof in different views, FIG. 5 shows a plan view of the top side of the scanning plate, and FIGS. 6*a* and 6*b* show views of the first and second plate of the distance determining device.

The second exemplary embodiment differs from the first exemplary embodiment primarily due to the fact that the beam path from light source 13.1 up to detection unit 14 no longer takes a course entirely in one plane, as was the case in the xz plane in the first exemplary embodiment.

In this exemplary embodiment, light source 13.1 is offset in the y direction relative to optical axis A and emits a beam of rays at an angle of inclination Θ with respect to optical axis A parallel to the xz plane. In the further course of the beam, reference beam of rays R and measuring beam of rays M, offset in the y direction, strike assigned first and second combined, diffractive deflection/lens elements 13.4*a*, 13.4*b* on the top side of scanning plate 13.3 in scanning unit 13. In this exemplary embodiment, their lens functions are selected such that both reference beam of rays R and measuring beam of rays M are focused onto reflector element 13.5 on the bottom side of scanning plate 13.3. Viewed laterally, the focus location again lies on optical axis A. Third and fourth combined, diffractive deflection/lens elements 13.4*c*, 13.4*d* are again formed symmetrically with respect to optical axis A. Because of the selected y-offset of light source 13.1, the optical path length of reference beam of rays R in scanning plate 13.3 is considerably longer than that of measuring beam of rays M. A suitable dimensioning of the thickness of scanning plate 13.3 makes it possible in this exemplary embodiment to compensate for the optical path length additionally covered by measuring beam of rays M between the two plates 1, 2, so that in their nominal position, the optical path lengths are again equalized. In contrast to the first exemplary embodiment, no additional reflector element is required here on the top side of scanning plate 13.3.

Figure 4A:
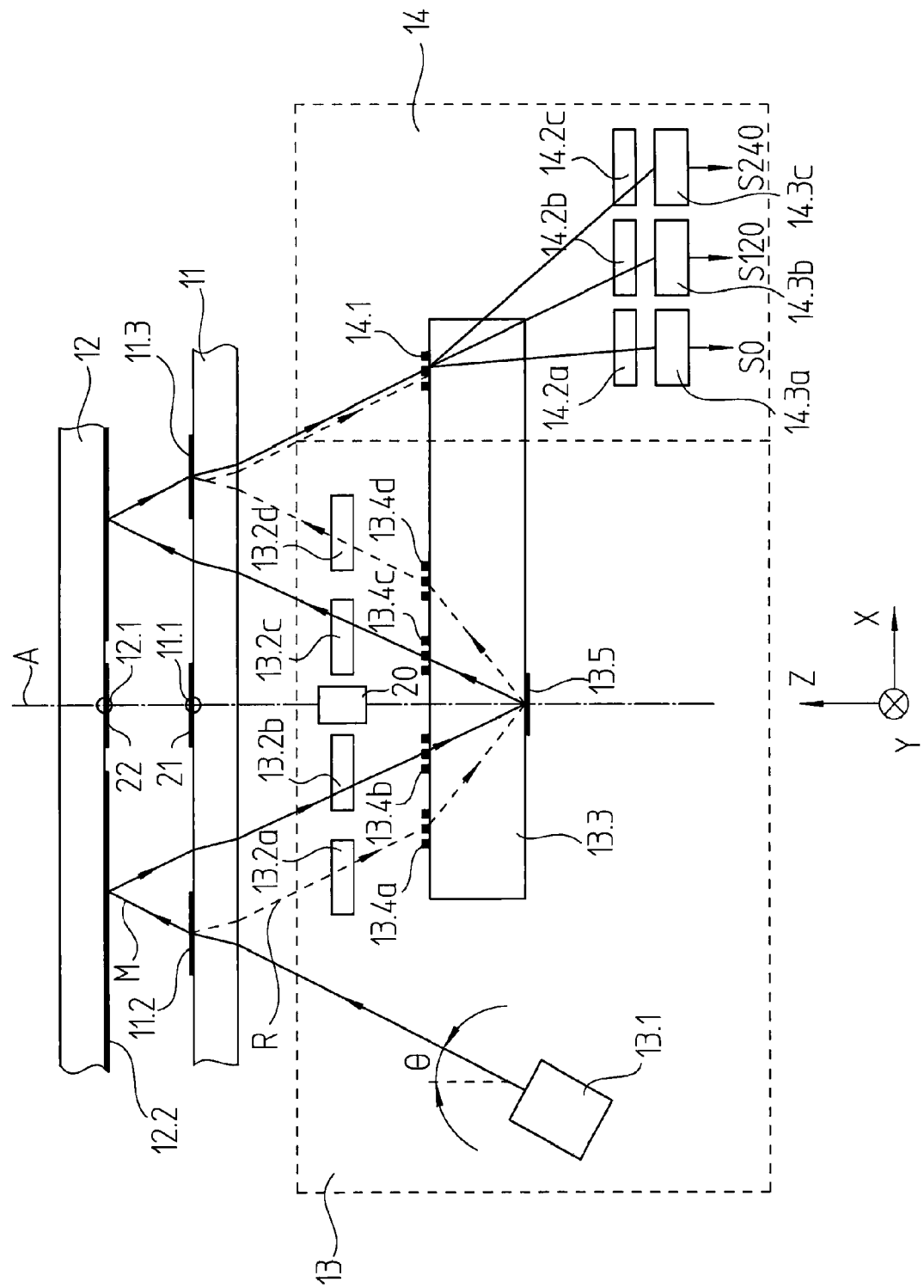
FIG. 4a is a schematic view of a beam path of a device according to an example embodiment of the present invention.
Figure 4B:
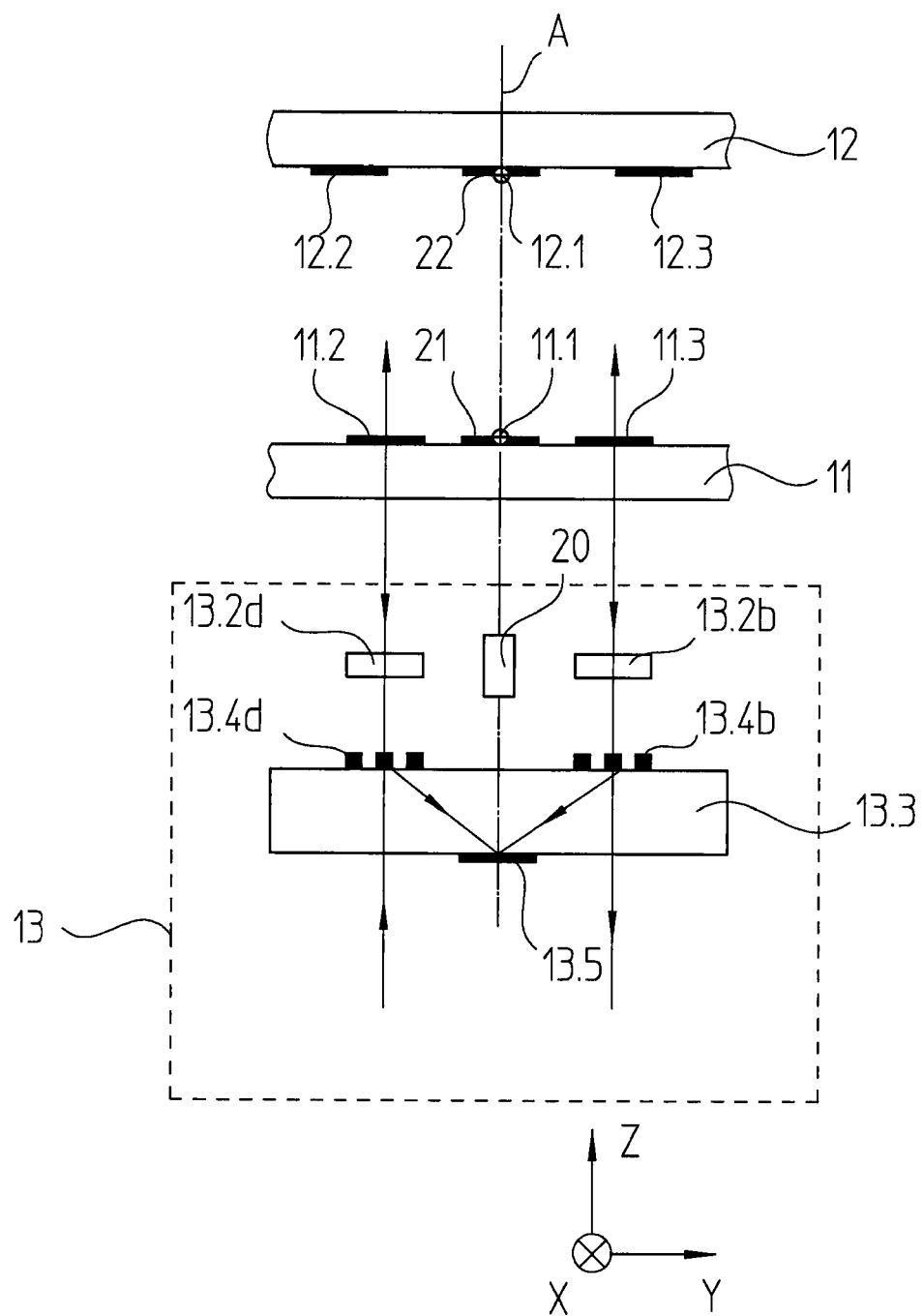
FIG. 4b is a schematic view of a section of the beam path illustrated in FIG. 4b.
Figure 6B:
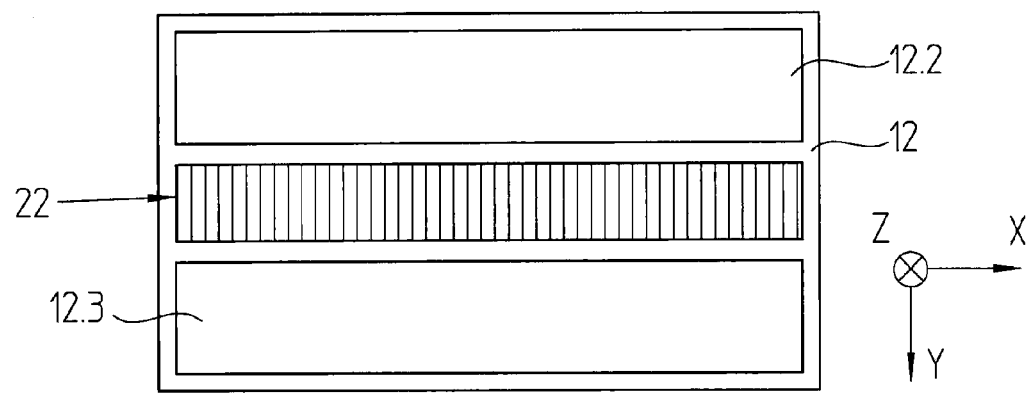
FIG. 6b is a plan view of the bottom side of the second plate of the device illustrated in FIGS. 4a and 4b.

As a further consequence of the beam path no longer traveling exclusively in the xz plane, in the second exemplary embodiment, on the bottom side of second plate 12—as illustrated in FIGS. 4*a* and 6*b*—two reflector elements 12.2, 12.3, again in the form of planar beam-splitter layers, are disposed set apart in the y-direction. The first and second reflections of measuring beam of rays M back from second plate 12 are accomplished via these reflector elements. 12.2, 12.3.

Because of the y-offset provided for light source 13.1 and most of the further optical components (13.4*a* to 13.4*d*, 13.2*a* to 13.2*d*, 14), in this exemplary embodiment of the distance determining device, more available space results in the area of optical axis A in order, for example, to integrate an optical position-measuring device there to determine the lateral position of plates 1, 2.

FIGS. 4*a*, 4*b*, 6*a*, and 6*b* schematically illustrate components of such an optical position-measuring device. They include a scanning head 20 assigned to scanning unit 13, as well as a first measuring standard 21 on first plate 11 and a second measuring standard 22 on second plate 12. First measuring standard 21 is located centrally between the two beam-splitter elements 11.2, 11.3 of first plate 11. Second measuring standard 22 is located centrally between the two reflector elements 12.2, 12.3 of second plate 12. For example, scanning head 20 may include a light source and a detector unit. In each case, an incremental graduation extending in the x-direction is provided as first and second measuring standard 21, 22.

Besides the two exemplary embodiments described herein, there are further possibilities for the alternative implementation of the distance determining device.

For example, instead of the combined, diffractive deflection/lens elements provided in the two exemplary embodiments, it is also possible in each case to provide a deflection element and a lens placed in tandem, to thereby attain the necessary optical deflection and focusing effect on the traversing beams of rays. For instance, gratings, prisms, or mirrors may be used as deflection elements. The lenses may be diffractive or refractive.

Furthermore, it is possible to provide the retroreflector functionality via triple mirrors or triple prisms, e.g., the diffractive or refractive lens, the assigned mirror and the subsequent diffractive or refractive lens may also be replaced by a triple prism or a triple mirror.

The coherence length of the light source may be selected to be so short that disturbing multiple reflections at the two plates are no longer capable of interference.

In addition, phase-shifted distance signals based on beams of rays polarized orthogonally relative to each other may also be generated in a manner alternative to that described in the two exemplary embodiments. For example, it is also possible to use polarizing beam splitters and wave plates in the detection unit.

Instead of generating two orthogonally polarized measuring and reference beams of rays with the aid of λ/8-plates, it is further possible to tilt the two interfering beams of rays slightly at an angle relative to each other, as well. Due to the tilting, upon the superposition in the detection unit, a stripe pattern is obtained that is able to be scanned by a structured photodetector, for example.

Other scanning methods for stripe patterns are also usable for generating the phase-shifted distance signals. For example, the two interfering beams of rays may also be tilted by selecting the angles of deflection of the combined, diffractive deflection/lens elements slightly differently for the measuring beam of rays and the reference beam of rays.

Moreover, it is also possible to balance out the optical path lengths of the measuring and reference beams of rays by inserting a flat slab glass of suitable thickness in the beam path of the reference beam of rays between the first plate and the scanning plate.

What is claimed is:

1. A device for interferometrically determining a vertical distance between two plates arranged substantially in parallel, comprising:
   a light source;
   at least one beam-splitter element;
   at least one reflector element;
   a plurality of deflection elements;
   a plurality of retroreflectors; and
   a detection unit;
   wherein the light source is adapted to emit a beam of rays that falls in inclined fashion upon a beam-splitter element on a first plate and is split into a reflected reference beam of rays and a transmitted measuring beam of rays, so that:
      the measuring beam of rays strikes a reflector element on a second plate and undergoes a first reflection back in a direction of the first plate;
      the reference beam of rays passes through a first deflection element and the measuring beam of rays passes through a second deflection element, the reference and measuring beams of rays each subsequently pass through an assigned retroreflector being arranged separately from the first plate and the second plate, and the measuring beam of rays then traverses a third deflection element and the reference beam of rays traverses a fourth deflection element, both the first and second deflection elements and the third and fourth deflection elements in each case producing different deflection effects on the traversing reference and measuring beams of rays;
      the reference beam of rays is then reflected at the first plate;
      the measuring beam of rays then undergoes a second reflection back at a reflector element of the second plate; and
      the measuring beam of rays and the reference beam of rays then propagate collinearly in a direction of the detection unit, the detection unit adapted to generate a plurality of phase-shifted distance signals from interfering measuring and reference beams of rays.

2. The device according to claim 1, wherein the retroreflectors include a first diffractive lens, a reflector element, and a second diffractive lens, the first diffractive lens adapted to focus the measuring beam of rays or the reference beam of rays onto the reflector element, and the second diffractive lens adapted to collimating an emergent measuring beam of rays or reference beam of rays reflected by the reflector element.

3. The device according to claim 2, wherein the first diffractive lens and the second diffractive lens are arranged on a first side of a plate-shaped, transparent carrier element, and the reflector element is arranged on an opposite second side of the carrier element with a reflective side oriented in a direction of the first side.

4. The device according to claim 2, wherein the first deflection element and the first diffractive lens and the fourth deflection element and the second diffractive lens of a first retroreflector are formed as a first and a fourth combined, diffractive deflection/lens element, and the second deflection element and the first diffractive lens and the third deflection element and the second diffractive lens of a second retroreflector are formed as a second and a third combined, diffractive deflection/lens element.

5. The device according to claim 4, wherein the combined, diffractive deflection/lens elements are arranged on a first side of a plate-shaped, transparent carrier element, and the reflector element is arranged on an opposite second side of the carrier element with a reflective side oriented in a direction of the first side.

6. The device according to claim 1, wherein optical path lengths of the measuring beam of rays and the reference beam of rays are identical in one defined nominal position.

7. The device according to claim 6, wherein the retroreflectors assigned to the measuring beam of rays and the reference beam of rays are formed differently to set identical optical path lengths.

8. The device according to claim 1, wherein the following relationship is satisfied for an angle at which the beam of rays, emitted by the light source, falls in inclined fashion upon the first plate:

$$\tan(\Theta) > rS/zP,$$

wherein $\Theta$ represents an angle with respect to a vertical to the first plate, at which angle the beam of rays emitted by the light source falls upon the first plate, rS represents a beam radius of the light source, and zP represents a distance between the first plate and the second plate.

9. The device according to claim 1, wherein the first plate is arranged as a transparent plane-parallel plate, a planar beam-splitter layer arranged in a spatially restricted first area on the transparent plane-parallel plate as a beam-splitter element on a side facing away from the light source, upon which the beam of rays, emitted by the light source, falls, and on the same side in a spatially restricted second area, a further planar beam-splitter layer is arranged on the transparent plane-parallel plate as a further beam-splitter element, upon which the measuring beam of rays falls after the second reflection back at the reflector element of the second plate, and upon which the reference beam of rays falls after traversing the fourth deflection element.

10. The device according to claim 9, wherein the first plate includes an antireflection layer on a side facing the light source and on the opposite side outside of the areas having the beam-splitter elements, and/or includes a diaphragm in an area in which the collinearly superposed measuring and reference beams of rays propagate in a direction of the detection unit.

11. The device according to claim 1, wherein the second plate is arranged as a transparent plane-parallel plate, planar mirror layers, arranged as reflector elements, provided on a side of the transparent plane-parallel plate facing the light source, reflective sides of the planar mirror layers oriented in a direction of the first plate.

12. A system, comprising:
the device for interferometrically determining a distance as recited in claim 1; and
an optical position-measuring device adapted to measure a relative shift of the first plate and the second plate parallel to placement planes of the two plates.

13. The system according to claim 12, wherein measuring points of the optical position-measuring device and of the device for interferometrically determining distance coincide.

14. A system, comprising:
a first plate;
a second plate arranged substantially in parallel to the first plate;
a device adapted to interferometrically determine a vertical distance between the first plate and the second plate, including:
  a light source;
  at least one beam-splitter element;
  at least one reflector element;
  a plurality of deflection elements;
  a plurality of retroreflectors; and
  a detection unit;
  wherein the light source is adapted to emit a beam of rays that falls in inclined fashion upon a beam-splitter element on the first plate and is split into a reflected reference beam of rays and a transmitted measuring beam of rays, so that:
    the measuring beam of rays strikes a reflector element on the second plate and undergoes a first reflection back in a direction of the first plate;
    the reference beam of rays passes through a first deflection element and the measuring beam of rays passes through a second deflection element, the reference and measuring beams of rays each subsequently pass through an assigned retroreflector being arranged separately from the first plate and the second plate, and the measuring beam of rays then traverses a third deflection element and the reference beam of rays traverses a fourth deflection element, both the first and second deflection elements and the third and fourth deflection elements in each case producing different deflection effects on the traversing reference and measuring beams of rays;
    the reference beam of rays is then reflected at the first plate;
    the measuring beam of rays then undergoes a second reflection back at a reflector element of the second plate; and
    the measuring beam of rays and the reference beam of rays then propagate collinearly in a direction of the detection unit, the detection unit adapted to generate a plurality of phase-shifted distance signals from interfering measuring and reference beams of rays.

15. A method for interferometrically determining a vertical distance between two plates arranged substantially in parallel, comprising:
emitting, by a light source, a beam of rays that falls in inclined fashion upon a beam-splitter element on a first plate;
splitting the beam of rays a reflected reference beam of rays and a transmitted measuring beam of rays;
striking the measuring beam of rays on a reflector element on a second plate;
reflecting the measuring beam of rays in a first reflection back in a direction of the first plate;
passing the reference beam of rays through a first deflection element;
passing the measuring beam of rays through a second deflection element;
subsequently passing the reference beam of rays and the measuring beam of rays through an assigned retroreflector being arranged separately from the first plate and the second plate;
traversing the measuring beam of rays through a third deflection element and the reference beam of rays through a fourth deflection element, both the first and second deflection elements and the third and fourth deflection elements in each case producing different deflection effects on the traversing reference and measuring beams of rays;
reflecting the reference beam of rays at the first plate;
reflecting the measuring beam of rays in a second reflection back at a reflector element of the second plate;
propagating the measuring beam of rays and the reference beam of rays collinearly in a direction of a detection unit; and
generating, by the detection unit, a plurality of phase-shifted distance signals from interfering measuring and reference beams of rays.

* * * * *